United States Patent Office 3,842,095
Patented Oct. 15, 1974

3,842,095
SULFONIC ACID PURIFICATION
Edward W. Heffern, Schaumburg, Dennis G. Petrille, Naperville, and Robert E. Karll, Batavia, Ill., assignors to Standard Oil Company, Chicago, Ill.
No Drawing. Filed Dec. 20, 1972, Ser. No. 316,841
Int. Cl. C07d 89/06
U.S. Cl. 260—327 S                    4 Claims

ABSTRACT OF THE DISCLOSURE

Separation of substantially pure oil-soluble alkenyl sulfonic acids and oil-soluble polymer sultones from sulfonation product mixtures obtained by the continuous treatment of viscous liquid propene or butene polymers having a number average molecular weight of about 250–500 with gaseous sulfur trioxide in a falling-film or static reactor is effected by treating the sulfonation product mixture with an aqueous water-immiscible hydrocarbon solvent and thereafter separating the aqueous and hydrocarbon solvent phases. Neutralization of the oil-soluble sulfonic acids and oil-soluble polymer sultones with anhydrous ammonia forms ammonium alkenyl sulfonates that do not require filtration.

FIELD OF THE INVENTION

This invention relates to the purification of oil-soluble sulfonic acids. More particularly it relates to the recovery of oil-soluble alkenyl sulfonic acids and oil-soluble sultones from crude sulfonation product mixtures.

SUMMARY OF THE INVENTION

It has been discovered that treatment of crude sulfonation product mixtures comprising alkenyl sulfonic acids and sultones with an aqueous water-immiscible inert hydrocarbon solvent yields a mixture of oil-soluble sulfonic acids and oil-soluble sultones that is storage stable and does not form oil-insoluble materials upon neutralization with monovalent bases such as ammonia, alkali metals, and amines.

The sulfonation product mixtures disclosed herein are complex mixtures comprising sulfonic acids, sultones, hexane-insoluble by-products or sludge, and unreacted polymer which acts as a carrier or solvent for the sulfonated materials.

In accordance with this invention, the process for separating oil-soluble alkenyl sulfonic acids wherein the alkenyl moiety is a propene or butene polymer having a number average molecular weight of about 250 to about 500 and sultones of said polymer from a sulfonation product mixture obtained by continuously treating a viscous liquid propene or butene polymer having a number average molecular weight of about 250 to about 500 with gaseous sulfur trioxide in a falling-film reactor or in a static reactor having interfacial surface generating means comprises: admixing said sulfonation product mixture with about 0.25 to about 1.25 volumes of a water-immiscible inert liquid hydrocarbon solvent per volume of said product mixture and about 3 to about 20, preferably 5 to 10, weight percent of water based on said product mixture and holding with agitation the aqueous mixture at a temperature of about 70° to 175° F. for about 0.25 to about 2 hours; thereafter separating the aqueous and hydrocarbon solvent phases, and recovering the hydrocarbon solvent phase containing said oil-soluble sulfonic acid and polymer sultones.

Falling-film reactors are well known in the sulfonation art as exemplified by U.S. Pat. 3,328,460. Liquid mixers having no moving parts are known. Generally, they comprise a mixing chamber provided with partitions or guide members to successively divide and reunite the stream of flowing liquid, that is, have interfacial surface generating means. U.S. Pats. 3,051,452; 3,051,453; 3,195,865; 3,206,170 and 3,286,992 are illustrative of the type of mixers that are suitable ofr use as static reactors to form crude sulfonation mixtures.

The term "activity" as used herein refers to the percent of polar material present in the crude sulfonation reaction and neutralized products by silica gel chromotography. A two-gram sample is diluted with 20 ml. hexane and deposited at room temperature on a 40 gram silica gel column having a 0.75 inch diameter. The unreacted polymer is eluted from the column with 250 ml. of hexane and weight obtained after evaporation of hexane. Sample weight minus weight of polymer yields total activity in sample. Sultone content is obtained by elution with 250 ml. of chloroform. Sulfonate content is total activity minus sultone.

DESCRIPTION OF THE PREFERRED EMBODIMENTS

Example I

Liquid polybutene (butene polymer having a number average molecular weight of about 340) was introduced into a slot-type falling-film reactor of the type described in U.S. Pat. 3,328,460 at a rate of 388 pounds per hour. The reactor was twenty-two feet long with a slot dimension of 5/8 inch by 24 inches. The film temperature in the reactor was 80–122° F. Gaseous sulfur trioxide diluted with air at a molar rate of 1.93 moles per mol of polybutene, was introduced concurrently to the film in the reactor at a rate of 170 pounds per hour and air rate of 900 cubic feet per minute at 18 p.s.i.g. Liquid residence time was about 125 to 150 seconds in the reactor. The crude acid mix from the reactor had a total activity of about 72 weight percent, contained about 46 weight percent sulfonic acid, about 7 weight percent hexane-insoluble sludge, and about 19 weight percent sultone.

The crude acid mix was diluted with an equal volume of hexane and 10 weight percent water. The aqueous mixture was held with agitation at 130–140° F. for one hour in a holding-settling tank. After a two-hour settling period, the aqueous phase was drawn off and the hexane-acid phase transferred to a reactor for neutralization.

Neutralization of the sulfonic acid-sultone mixture in hexane was effected by introducing anhydrous ammonia into the mixture at a rate of two cubic feet per hour per gallon while maintaining temperature of the mixture below 150° F. until a color change of from black to amber is noted which indicated neutralization of the sulfonic acid. At that point the ammonia rate was reduced to 0.5 cubic feet per hour per gallon and the temperature of the mixture raised to drive off hexane and water to a temperature of 310° F. The mixture was held at 310° F. with continued introduction of ammonia for two hours to reduce the sultone content at which time the treatment was terminated. The neutralized product containing 64.6 weight percent ammonium alkenyl sulfonate and 2.8 weight percent sultone was a crystal clear liquid that did not require filtration.

Example II

A sulfonation product of the polybutene of example I from the same butene polymer contained 6 weight percent hexane-insoluble sludge and had a total activity of 75 weight percent. Neutralization with ammonia as in example I gave a product, having an activity of 70 weight percent and containing 25 weight percent oil-insoluble material, which could only be filtered after dilution with hexane.

Example III

A sulfonation product of the polybutene of example I and similarly prepared had an activity of about 74% and contained about 7 weight percent hexane-insoluble sludge. The mixture was treated with hexane and sludge, about 5 weight percent, settled out. Ammonia neutralization of the hexane phase as in example I gave a neutralized product having an activity of 62 weight percent and containing about 2 weight percent hexane-insoluble solids, which filtered very slowly and gave a hazy filtrate.

Example IV

A sulfonation product prepared as in example I with the same polybutene had an activity of 75 weight percent and contained 6 weight percent hexane-insoluble sludge. Five weight percent water was added to a portion of the mixture. The aqueous mixture was agitated at room temperature, settled and phase separated. The organic phase was treated with ammonia as in example I. Filtration of the neutralized product, having an activity of 69 weight percent and containing 6 weight percent oil-insoluble materials, was very slow.

Example V

To the balance of the sulfonation product mixture of example IV was added an equal volume of hexane and 5 weight percent water. The aqueous mixture was held at 140–148° F., with stirring, for one hour; settled for one hour and phase separated. Treatment of the separated organic phase with ammonia as in example I, gave a crystal clear product, having an activity of about 70 weight percent, that did not require filtration.

Example VI

Liquid polybutene having a number average molecular weight of about 340 was treated with gaseous sulfur trioxide in a static reactor of the type described in U.S. Pat. 3,286,992 to give a sulfonation product mixture having an activity of 89.3 weight percent and containing 35.9 hexane-insoluble sludge. The static reactor, containing 21 elements (interfacial surface generating means), has an I.D. of ¼ inch and is 9 inches in length. A liquid stream of the polybutene flowing at a rate of 1.68 grams per minute was introduced cocurrently with an air stream, flowing at a rate of 20,000 cc. per minute, containing 0.70 cc. per minute of sulfur trioxide into the static reactor. Sulfonation product was discharged from the reactor at a rate of 2.10 grams per minute. The molar ratio of sulfur trioxide to polymer being about 2.5 in the flowing streams. To the sulfonation product mixture was added an equal volume of hexane and 10 weight percent water. The aqueous mixture was heated to and held at 140° F., with stirring, for one hour, then settled for one hour and phases separated. The hexane phase was then treated with ammonia as in example I. The neutralized product was a crystal clear liquid, having an activity of 76%, free of oil-insoluble material and did not require filtration.

The inert water-immiscible liquid hydrocarbon diluent is preferably an aliphatic hydrocarbon, such as hexane or heptane, that is not volatile below 175° F. but which can be removed, if desired, during subsequent neutralization of the oil-soluble acidic components. When it is not necessary to remove the solvent, a light petroleum fraction such as kerosene may be used.

We claim:

1. The process for separating a mixture of (a) oil-soluble alkenyl sulfonic acids wherein the alkenyl moiety is a propene or butene polymer having a number average molecular weight of about 250 to about 500 and (b) oil-soluble sultones of said polymer from a sulfonation product mixture obtained by continuously treating a viscous liquid propene or butene polymer having a number average molecular weight of about 250 to about 500 with gaseous sulfur trioxide in a falling-film reactor or in a static reactor having interfacial surface generating means, which process comprises:

admixing said sulfonation product mixture with about 0.25 to about 1.25 volumes of a water-immiscible inert liquid hydrocarbon solvent per volume of said product mixture and about 3 to about 20 weight percent of water based on said product mixture and holding with agitation the aqueous mixture at a temperature of about 70° to 175° F. for about 0.25 to about 2 hours; thereafter separating the aqueous and hydrocarbon solvent phases, and recovering the hydrocarbon solvent phase containing said mixture of oil-soluble sulfonic acid and polymer sultones.

2. The process of claim 1 wherein the hydrocarbon solvent is hexane.

3. The process of claim 2 wherein said polymer is a butene polymer.

4. The process of claim 3 wherein the average molecular weight of said polymer is about 300 to about 400.

References Cited

UNITED STATES PATENTS

| | | | |
|---|---|---|---|
| 3,164,609 | 1/1965 | Voss | 260—327 |
| 3,579,537 | 5/1971 | Rubinfeld | 260—327 |
| 3,409,637 | 11/1968 | Eccles | 260—327 |
| 2,865,958 | 12/1958 | Davies | 260—504 |
| 2,677,702 | 5/1954 | Bloch | 260—513 |
| 3,328,460 | 6/1967 | Vander Mey | 260—505 |
| 3,051,452 | 8/1962 | Nobel | 259—4 |
| 3,051,453 | 8/1962 | Sluijters | 259—4 |
| 3,195,865 | 7/1965 | Harder | 259—4 |
| 3,206,170 | 9/1965 | Schippers | 259—4 |
| 2,406,763 | 9/1946 | Griesinger | 260—504 |
| 2,559,439 | 7/1951 | Jones | 260—504 |

OTHER REFERENCES

Weissberger, Technique of Organic Chemistry, Vol. III (Interscience, New York, 1956), pp. 150–2.

HENRY R. JILES, Primary Examiner

C. M. S. JAISLE, Assistant Examiner

U.S. Cl. X.R.

260—506 R, 515

PO-1050
(5/69)

UNITED STATES PATENT OFFICE
CERTIFICATE OF CORRECTION

Patent No. 3,842,095            Dated       October 15, 1974

Inventor(s) Edward W. Heffern, Dennis G. Petrille and Robert E. Karll

It is certified that error appears in the above-identified patent and that said Letters Patent are hereby corrected as shown below:

Col. 2, line 5, for "ofr" read --for--;

line 32, for "concurrently" read --cocurrently--;

line 64, "of the polybutene" read --mixture prepared as in--.

Signed and sealed this 18th day of February 1975.

(SEAL)
Attest:

RUTH C. MASON
Attesting Officer

C. MARSHALL DANN
Commissioner of Patents
and Trademarks